(12) United States Patent
Kang et al.

(10) Patent No.: US 8,329,769 B2
(45) Date of Patent: Dec. 11, 2012

(54) FACILE SYNTHESIS OF MICROPOROUS TRIPLE-BOND BASED POLYMER NETWORKS USING ACETYLENE GAS AS A BUILDING UNIT

(75) Inventors: Jeung-Ku Kang, Daejeon (KR);
Jung-Hoon Choi, Daejon (KR);
Kyung-Min Choi, Daejeon (KR);
Hyung-Joon Jeon, Daejeon (KR);
Yoon-Jeong Choi, Daejeon (KR); Yeob Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 249 days.

(21) Appl. No.: 12/820,725

(22) Filed: Jun. 22, 2010

(65) Prior Publication Data

US 2011/0152393 A1  Jun. 23, 2011

(30) Foreign Application Priority Data

Dec. 10, 2009 (KR) .......................... 10-2009-0122650

(51) Int. Cl.
*C08G 61/00* (2006.01)
*C08J 9/00* (2006.01)

(52) U.S. Cl. .................. 521/50; 525/328.1; 526/285

(58) Field of Classification Search ................. 521/50; 525/328.1; 526/285
See application file for complete search history.

(56) References Cited

U.S. PATENT DOCUMENTS

2003/0078416 A1 *  4/2003  Tor et al. ................. 536/28.54

OTHER PUBLICATIONS

Jiang, J., et al., "Conjugated Microporous Poly(aryleneethynylene) Networks," *Angew. Chem. Int. Ed. 46*:8574-8578, Wiley-VCH Verlag GmbH & Co. KGaA, Germany (2007).
El-Kaderi, H., et al., "Designed Synthesis of 3D Covalent Organic Frameworks," *Science 316*:268-272, American Association for the Advancement of Science, United States (2007).
Kuhn, P., et al., "Porous, Covalent Triazine-Based Frameworks Prepared by Ionothermal Synthesis," *Angew. Chem. Int. Ed. 47*:1-5, Wiley-VCH Verlag GmbH & Co. KGaA, Germany (2008).

* cited by examiner

*Primary Examiner* — Irina S Zemel
(74) *Attorney, Agent, or Firm* — Sterne, Kessler, Goldstein & Fox P.L.L.C.

(57) ABSTRACT

Disclosed is a method for synthesis of micro-porous triple-bond based polymer networks using acetylene gas. According to the disclosed methods for synthesis of micro-porous triple-bond based polymer networks, acetylene gas interconnects building units having iodine and/or bromine functional groups by coupling reactions to provide micro-porous triple-bond based polymer networks.

2 Claims, 4 Drawing Sheets

(a)

Figure 1:
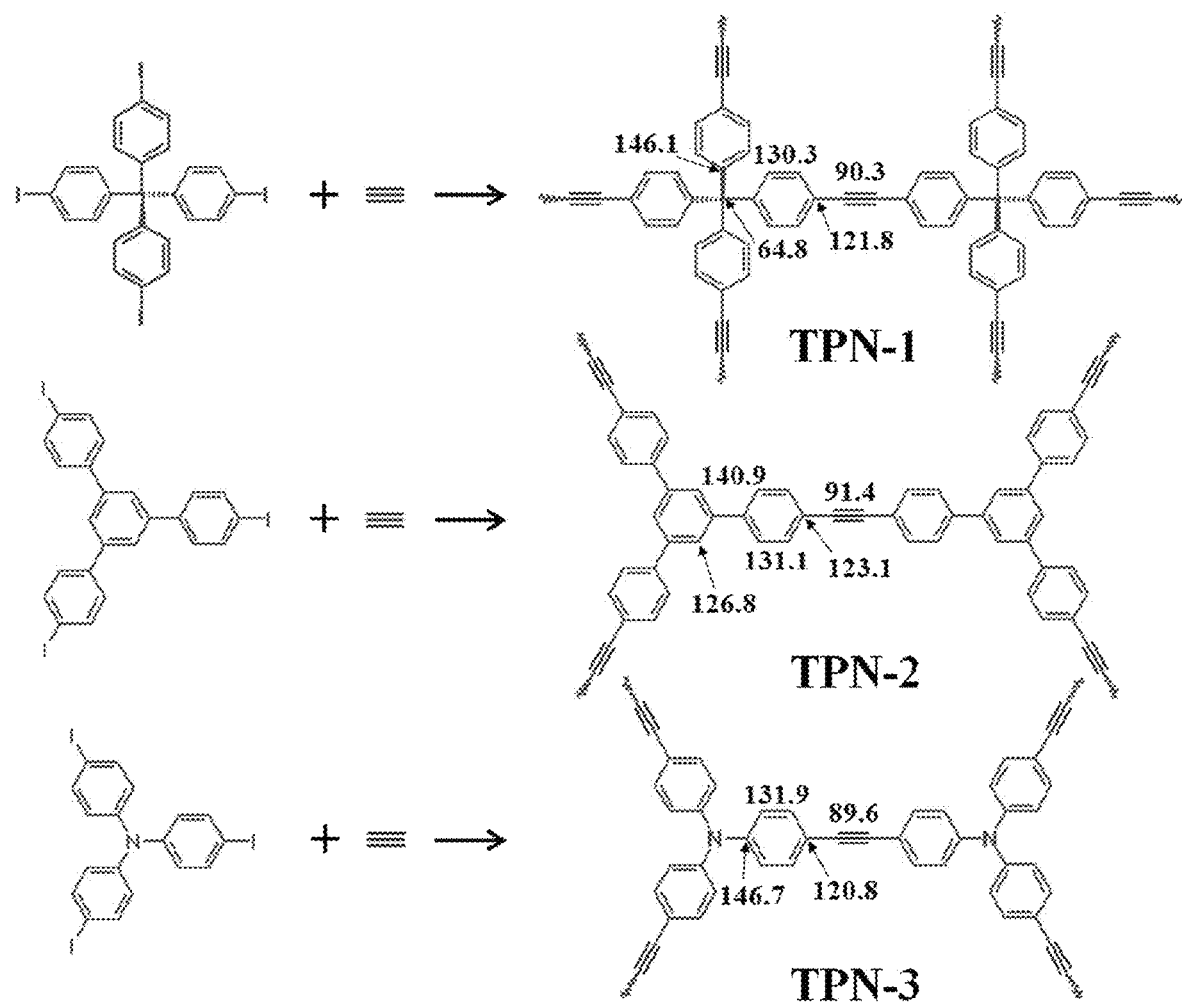

FIGs. 2(b)-(c)
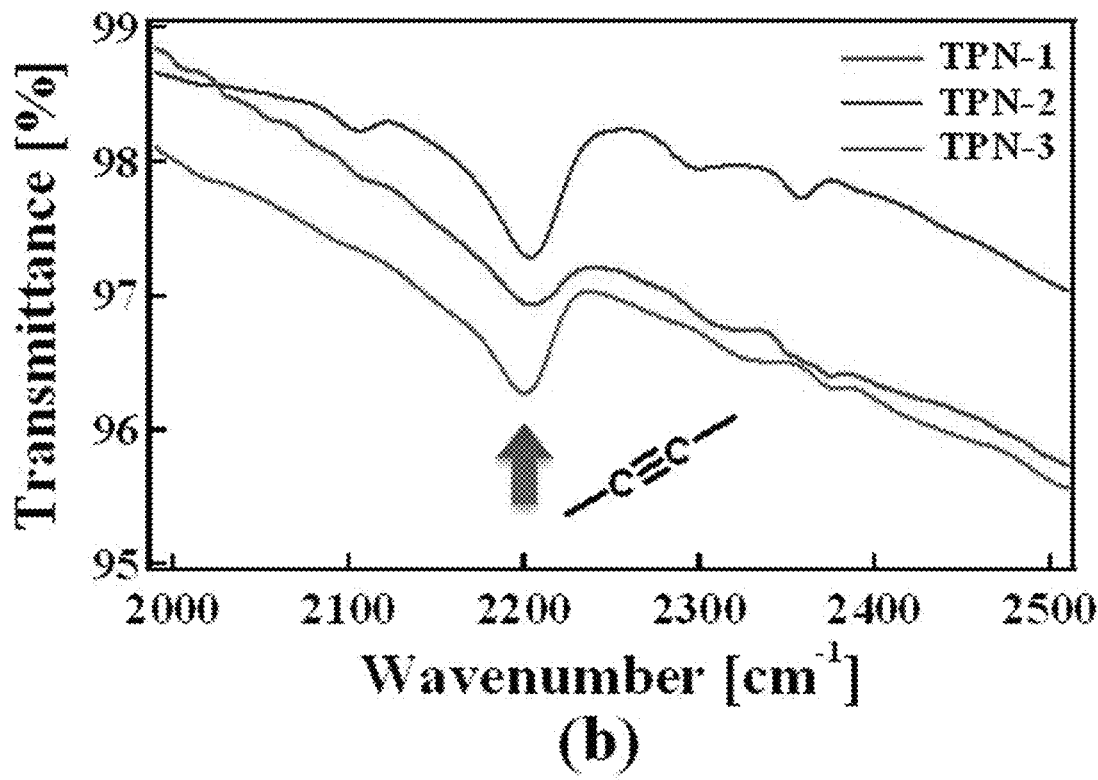
(b)
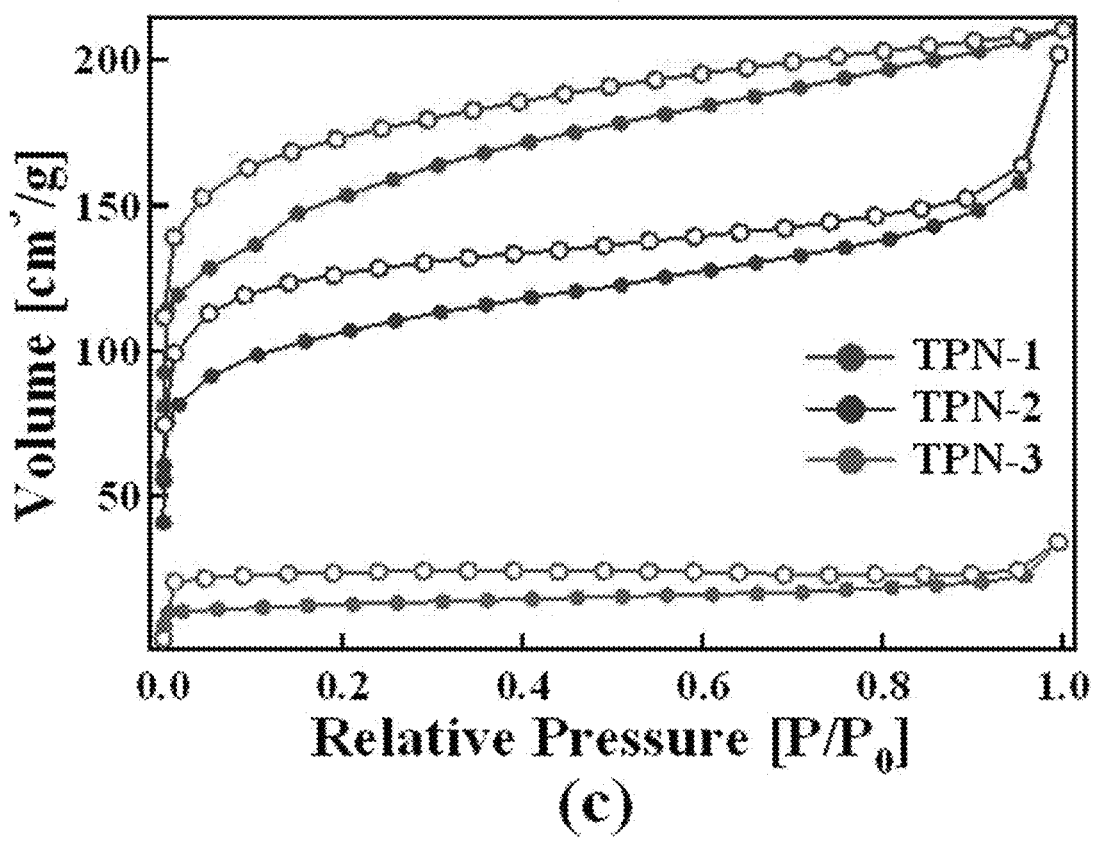
(c)

FIGs. 3(a)-(b)
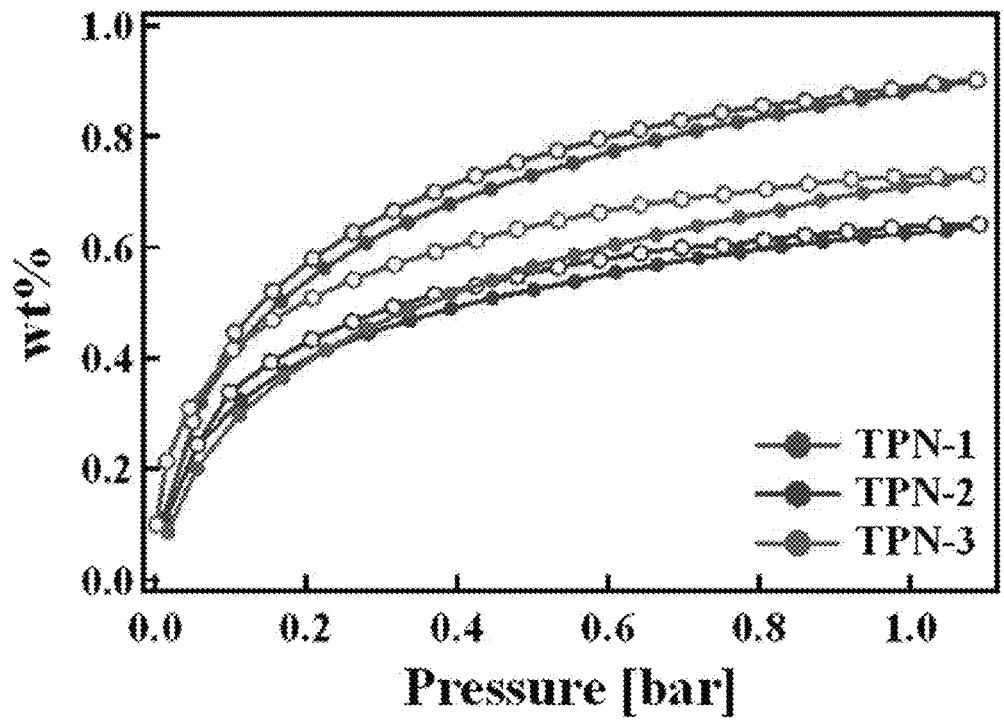
(a) $H_2$ isotherm
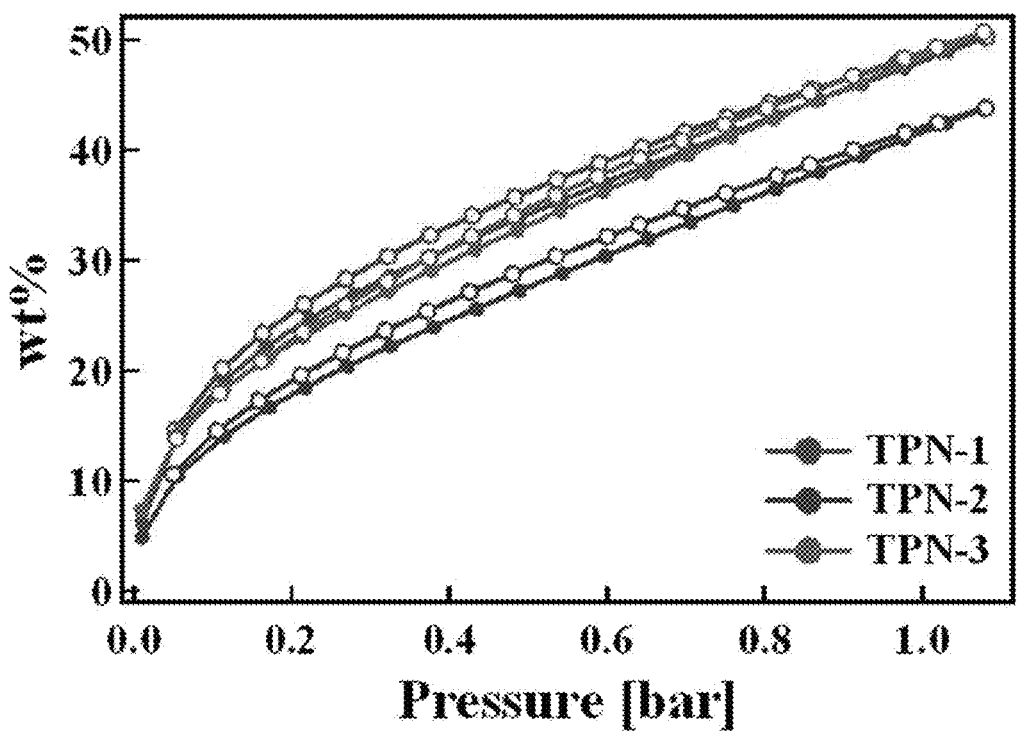
(b) $CO_2$ isotherm

FACILE SYNTHESIS OF MICROPOROUS TRIPLE-BOND BASED POLYMER NETWORKS USING ACETYLENE GAS AS A BUILDING UNIT

CROSS REFERENCE TO RELATED APPLICATIONS

This application claims priority from Korean Patent Application No. 10-2009-0122650, filed on Dec. 10, 2009 in the Korean Intellectual Property Office, the disclosure of which is incorporated herein by reference in its entirety.

BACKGROUND OF THE INVENTION

1. Field of the Invention

The present invention relates to a method for synthesis of micro-porous triple-bond based polymer networks (TPNs) using acetylene gas. With regard to synthesis of a micro-porous polymer network, acetylene gas was first used as a building unit. Acetylene gas interconnects building units having iodine functional groups through coupling reaction and, by such chain coupling reaction, polymer networks having micro-pores have been synthesized. The foregoing method enables synthesis of polymer networks by coupling reaction of acetylene gas with building units having bromine functional groups, other than the building units having iodine functional groups.

2. Background Art

With regard to applications of hydrogen or carbon dioxide storage medium, heterogeneous catalyst, dye adsorption and/or photo-catalyst, a great deal of studies and investigations into synthesis of micro-porous organic based structures are currently underway. A representative one among them is a covalent organic framework synthesized by Yaghi Co. (See *Science* 316:268 (2007)).

Since covalent organic frameworks, which are organic structures having micro-pores without metallic components, have been successfully synthesized, various micro-porous organic structures have been able to be fabricated in massive quantities. For example, covalent triazine-based frameworks (see *Angew. Chem. Int. Ed.* 47:1 (2008)) and conjugated microporous polymers (see *Angew. Chem. Int. Ed.* 46:8574 (2007)) have been synthesized.

BRIEF SUMMARY OF THE INVENTION

The present invention provides a method for synthesis of triple-bond based polymer networks directly using acetylene gas in order to introduce triple-bonds into the polymer network.

For conventional triple-bond based polymer networks, that is, conjugated microporous polymers, a triple-bond is firstly adhered to a building unit and a plurality of such building units form a network through coupling reaction. That is, a complicated multi-stage process is required.

In contrast, the present inventive synthesis method adopts direct coupling reaction of acetylene gas with building units to form a polymer network while generating triple-bonds.

Accordingly, compared to the foregoing conventional process of forming conjugated microporous polymers, a relatively facile method for synthesis of triple-bond based polymer networks is provided.

In order to accomplish the purpose described above, the present invention proposes direct use of acetylene gas as a building unit. A building unit having a iodine functional group and another building unit based on acetylene gas form a bond through coupling reaction. According to the aforedescribed process, a polymer network having micro-pores is fabricated. Here, acetylene gas is introduced by bubbling. The method for synthesis of micro-porous triple-bond based polymer networks according to the present invention can also be applied to building units having bromine functional groups, in turn fabricating the same series of new polymer networks.

The present inventive method for synthesizing micro-porous triple-bond based polymer networks is a facile process, and is more simple than conventional methods for fabricating similar structures. In addition, triple-bonds present in the polymer networks fabricated according to the present invention can be functionalized by metal doping and/or forming an organic metal complex. Thus, the triple-bond based polymer networks provided herein can be utilized in various applications such as hydrogen and carbon dioxide storage materials, heterogeneous catalysts, photo-catalysts, and the like.

BRIEF DESCRIPTION OF THE DRAWINGS/FIGURES

Figure 2A:
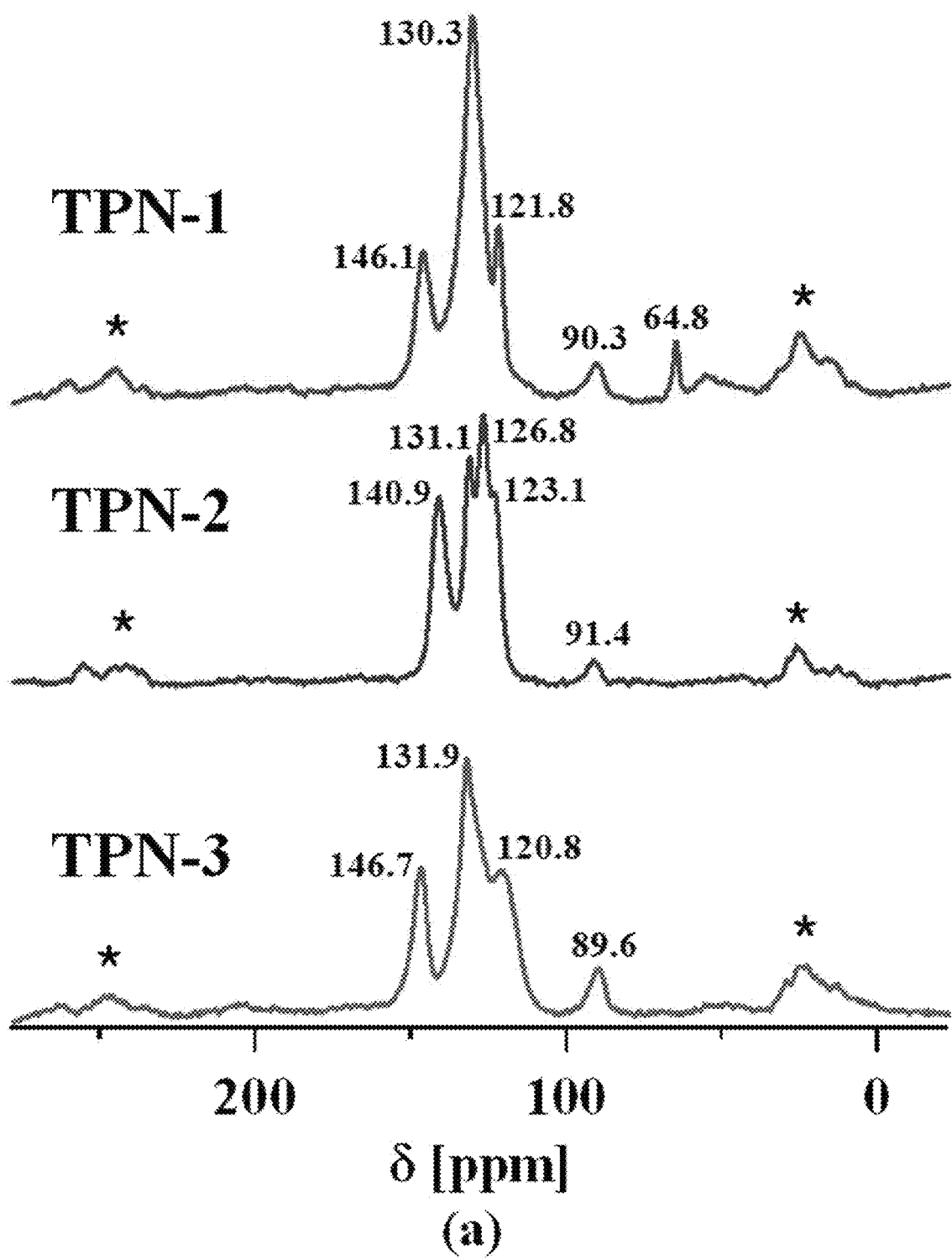

The above and other objects, features and other advantages of the present invention will be more clearly understood from the following detailed description taken in conjunction with the accompanying drawings, in which:

FIG. 1 is a schematic view illustrating a process for synthesis of triple-bond based polymer networks of the present invention, including chemical shift values of solid-state $^{13}C$ CPMAS NMR;

FIG. 2(a) shows solid-state $^{13}C$ CPMAS NMR analysis results of triple-bond based polymer networks of the present invention, FIG. 2(b) shows FT-IR spectra of TPNs, and FIG. 2(c) shows $N_2$ isothermal adsorption graphs of triple-bond based polymer networks of the present invention; and FIG. 3(a) illustrates hydrogen adsorption characteristics of triple-bond based polymer networks of the present invention, and FIG. 3(b) illustrates carbon dioxide adsorption characteristics of triple-bond based polymer networks of the present invention.

DETAILED DESCRIPTION OF THE INVENTION

According to an exemplary embodiment of the present invention, there is provided a method for synthesis of micro-porous triple-bond based polymer networks using acetylene gas.

More particularly, the methods for synthesis of micro-porous triple-bond based polymer networks using acetylene gas according to the exemplary embodiments comprises: reacting a building unit having a iodine functional group with an acetylene gas building unit through chain coupling reaction to fabricate a polymer network having micro-pores.

In some embodiments, the methods of the present invention comprise combining a brominated or iodinated building unit, acetylene gas, a metal iodide (e.g., CuI), and a palladium catalyst (e.g., dichlorobis(triphenylphosphine)palladium(II) and the like) in a solvent, and heating for about 1 hour to about 48 hours at a temperature of about 30° C. to about 100° C.

Brominated and iodinated building units suitable for use with the present invention include, but are not limited to, tetrakis(4-iodophenyl)methane, tris(4-iodophenyl)methane, 1,3,5-tris(4-iodophenyl)benzene, tris(4-iodophenyl)amine, tetrakis(4-bromophenyl)methane, tris(4-bromophenyl)methane, 1,3,5-tris(4-bromophenyl)benzene, tris(4-bromophenyl)amine, and the like, and combinations thereof.

A chain coupling reaction of the present invention can be performed by combining the reagents at a temperature of about 30° C. to about 100° C., about 40° C. to about 90° C., about 50° C. to about 80° C., about 50° C. to about 70° C., or about 60° C. for a period of about 1 hour to about 24 hours, about 2 hours to about 22 hours, about 3 hours to about 20 hours, about 4 hours to about 18 hours, about 6 hours to about 16 hours, about 8 hours to about 14 hours, about 10 hours, about 12 hours, or about 15 hours, about 18 hours, or about 24 hours.

Following heating, the reaction is cooled to room temperature (about 25° C.), filtered and washed using, for example, dichloromethane. This washing can be performed for about 1 day to about 5 days, or about 3 days to about 4 days. Additional washing using water and acetone for about 1 hour to about 10 hours, or about 6 hours, and then, further washing with, for example, dichloromethane for several hours in sequential order, removes impurities contained in the pores of the polymer network. The products are then dried at about 30° C. to about 100° C., or about 60° C. under a vacuum for about 1 day. Further drying can be performed at about 100° C. to about 200° C., or about 150° C. for about 1 hour to about 6 hours, or about 3 hours.

With regard to fabrication of such micro-porous polymer network by chain coupling reaction between a building unit having an iodine functional group and an acetylene gas building unit, the fabricated micro-porous polymer network can comprise any one selected from TPN-1, TPN-2, and TPN-3, which are represented by the following Formulae 1, 2, and 3, respectively:

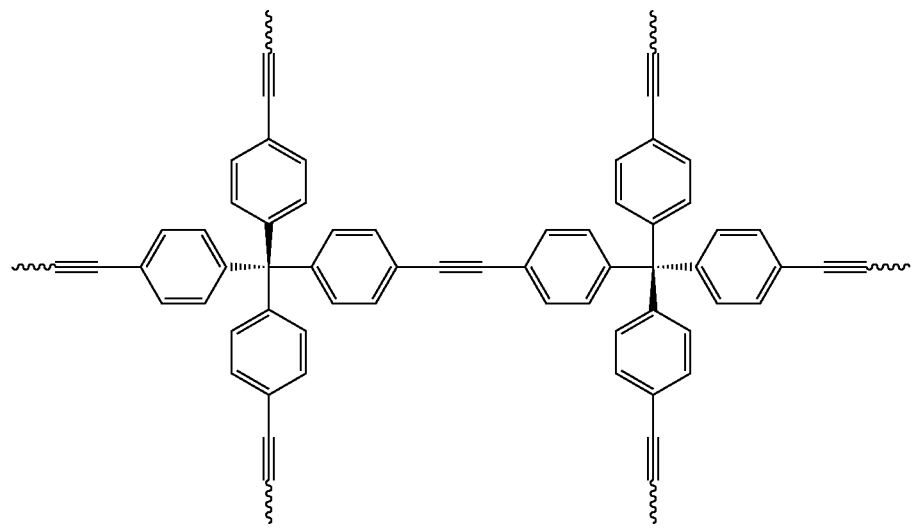

Formula 1

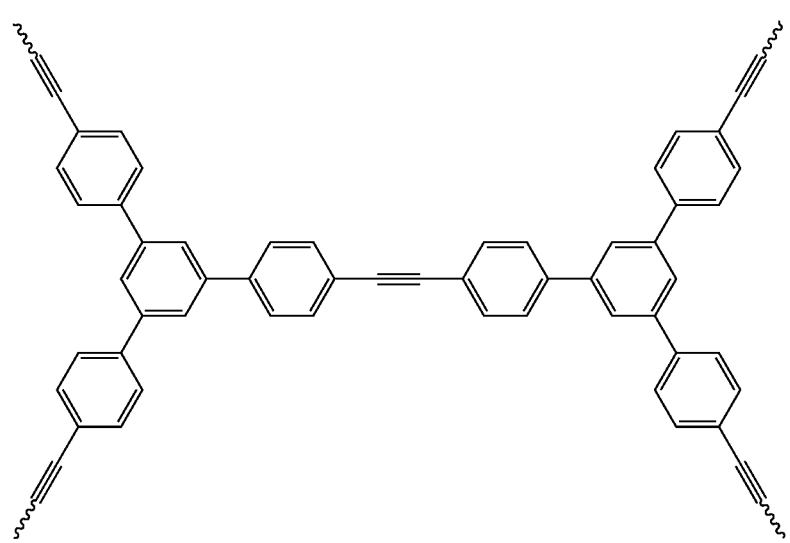

Formula 2

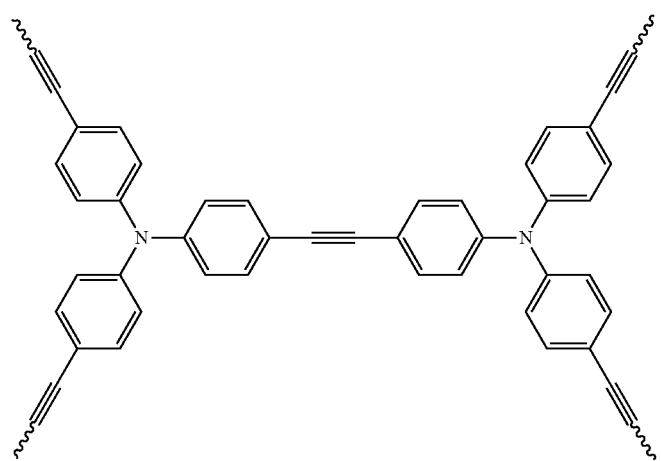

Formula 3

According to other embodiments of the present invention, there is provided a method for synthesis of a micro-porous triple-bond based polymer network (TPN) using acetylene gas, comprising: conducting chain coupling reaction of a building unit having a bromine functional group with an acetylene gas building unit.

With regard to fabrication of micro-porous polymer networks by chain coupling reaction between the building unit having the bromine functional group and the acetylene gas building unit according to the foregoing embodiment, the fabricated micro-porous triple-bond based polymer network can comprise any one selected from TPN-1, TPN-2, and TPN-3, which are represented by the following formulae 1, 2, and 3, respectively:

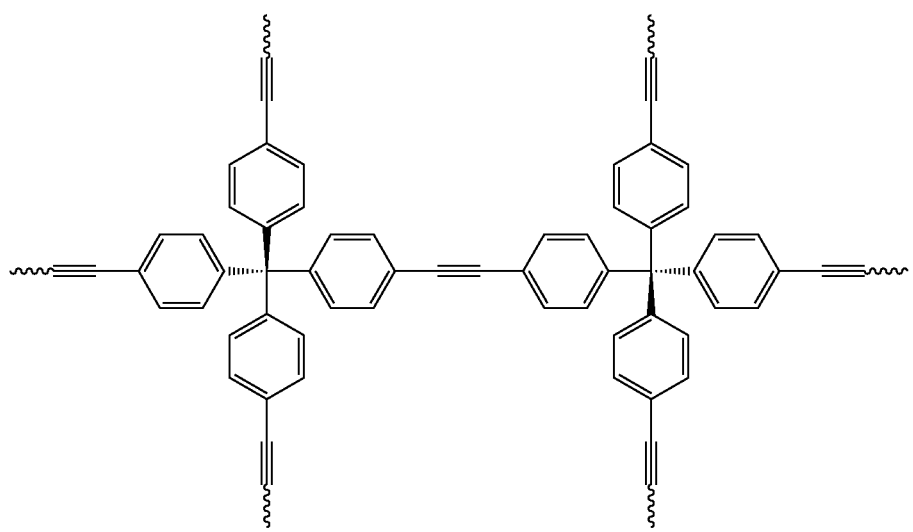

Formula 1

Formula 2

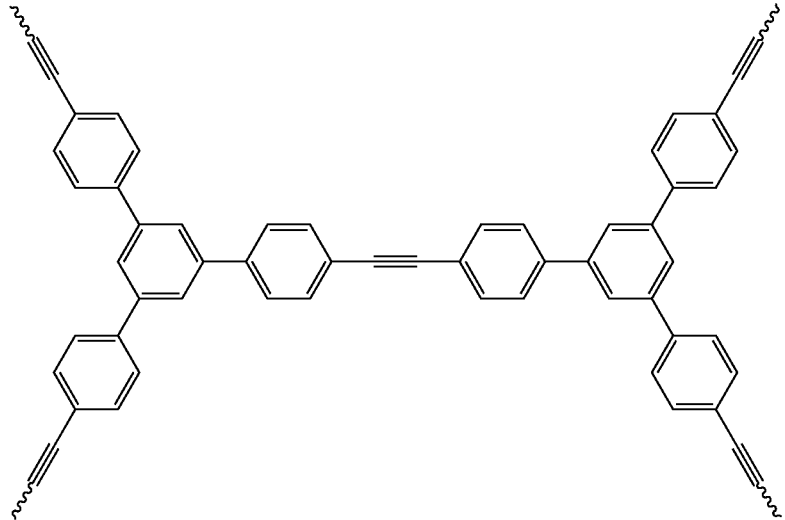

Formula 3

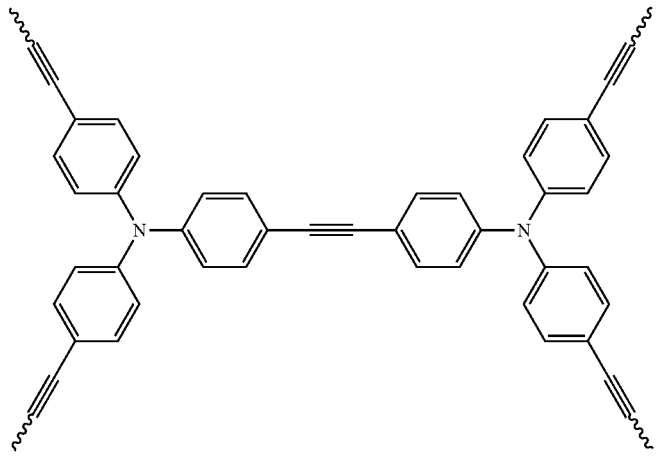

FIG. 1 is a schematic view illustrating a process for synthesis of triple-bond based polymer networks. Three kinds of triple-bond based polymer networks, i.e., TPN-1, TPN-2, and TPN-3 were fabricated. Each of TPN-1, TPN-2, and TPN-3 can be formed as a micro-porous polymer network by reacting a building unit having a iodine functional group with an acetylene gas building unit through coupling reaction.

In some embodiments, the methods of the present invention synthesize a polymer network directly by methods using acetylene gas to form a polymer network. However, the methods can also be applied to precursors having a bromine functional group without restriction to the building unit having a iodine functional group. This is because the coupling reaction is commonly applied to both iodine and bromine. In some embodiments, when precursors having an iodine functional group are used for formation of the polymer network, the surface area of resulting structure is generally larger than that of polymer network obtained using building units having bromine functional groups. Thus, in some embodiments the present invention is directed to a process for forming a triple-bond based polymer network using one or more precursors having an iodine functional group.

After synthesis of triple-bond based polymer networks (e.g., TPN-1, TPN-2, and TPN-3), the polymer networks are subjected to structural analysis using solid-state $^{13}$C CPMAS NMR, as provided in FIG. 2(a). In the solid state NMR, a chemical shift of about 90 ppm arises from carbon-carbon triple-bonds, thus demonstrating that the polymer networks comprise a network of —C≡C— triple-bonds. The carbon-carbon triple-bonds can also be identified using Fourier Transform Infrared Spectroscopy ("FT-IR"). Referring to the FT-IR spectra in FIG. 2(b), peaks at 2,200 cm$^{-1}$ corresponding to carbon-carbon triple-bonds were observed, thus demonstrating that a network was formed comprising carbon-carbon triple-bonds.

Specific surface area and pore size distribution were analyzed using $N_2$ isothermal adsorption. Graphs obtained from $N_2$ isothermal adsorption of triple-bond based polymer networks of the present invention are shown in FIG. 2(c). Using this data, Brunauer-Emmett-Teller ("BET") specific surface areas for exemplary polymer networks of the present invention were determined as follows: 629 m$^2$/g for TPN-1, 380 m$^2$/g for TPN-2 and 46 m$^2$/g for TPN-3, respectively. That is, it can be seen that BET specific surface area of the polymer network correlates with the chemical structure of the precursor building units. For TPN-1, the building unit has three-dimensional structure comprising a tetrahedral form, and thus a relatively high specific surface area polymer network is formed. As a result of estimating a pore size distribution from a quenched solid density functional theory ("QSDFT") model using $N_2$ slit pore kernel at 77 K, formation of polymer networks having micro-pores with a pore size of: 8.5 Å, 18.3 Å for TPN-1; 9.3 Å for TPN-2; and 14.1 Å for TPN-3, was identified.

In order to understand gas adsorption characteristics of TPNs, hydrogen and carbon dioxide isothermal adsorption graphs were measured. FIG. 3(a) shows hydrogen adsorption characteristics, and FIG. 3(b) shows carbon dioxide adsorption characteristics of triple-bond based polymer networks of the present invention. Maximum hydrogen storage at 77 K and 1 atm obtained from the polymer networks were 0.90 wt. % for TPN-1, 0.64 wt. % for TPN-2 and 0.73 wt. % for TPN-3, respectively.

Not being bound by any particular theory, because TPN-1 has the largest specific surface area, the hydrogen storage capacity of TPN-1 is also the highest among the exemplary TPNs synthesized herein.

On the other hand, TPN-3 has a relatively smaller specific surface area than that of TPN-2, however, the hydrogen storage capacity of TPN-3 is higher than that of TPN-2. Not being bound by any particular theory, this can be attributable to nitrogen bridging groups present in TPN-3, the non-covalent electron pairs of which can interact with gases adsorbed therein. This hypothesis is supported by the observed carbon dioxide storage capacity of the triple-bond based polymer networks. The maximum carbon dioxide storages at 195K and 1 atm were: 50.34 wt. % for TPN-1, 43.89 wt. % for TPN-2 and 50.77 wt. % for TPN-3, respectively. Carbon dioxide storage is much the same as hydrogen storage. Because TPN-3 shows excellent interaction between nitrogen having non-covalent electron pairs and carbon dioxide, carbon dioxide storage characteristics can be considerably improved, although a specific surface area is at least 13 times smaller than that of TPN-1.

As such, by selecting any one of building units having iodine functional groups and bromine functional groups used for coupling reaction with an acetylene gas building unit according to the inventive synthesis method, a number of triple-bond based polymer networks having different features can be fabricated using the methods described herein. Exemplary embodiments of the present inventive method will be described in detail.

The following examples will be given of illustrating preferred embodiments of the present invention. However, such embodiments are provided for illustrative purposes but are not construed to restrict the scope of the present invention as defined by the appended claims.

EXAMPLE 1

Synthesis of TPN-1

TPN-1 (Triple-bond based polymer network-1) represented by Formula 1 was fabricated by coupling reaction of tetrakis(4-iodophenyl)methane building unit and an acetylene gas building unit. All reactions were performed under Ar atmosphere.

1 mmol of tetrakis(4-iodophenyl)methane, 38 mg of CuI and 70 mg of dichlorobis(triphenylphosphine)palladium(II) were placed in a round bottom flask, followed by adding 80 mL of piperidine as a solvent. Then, the mixture was stirred at 60° C. for 12 hours while bubbling acetylene gas. Coupling reaction started with a flow rate of about 10 cc/mL, within 5 minutes after bubbling of acetylene gas. Afterward, the treated mixture was subjected to heat treatment at 60° C. for 12 hours under stirring without acetylene gas bubbling. Following this, the treated material was cooled down to room temperature, filtered and washed using dichloromethane for 3 to 4 days, using water and acetone for 6 hours, and then, using dichloromethane for several hours in sequential order, so as to remove impurities contained in pores. After drying the obtained product at 60° C. under vacuum for 1 day, the dried product was heated at 150° C. for 3 hours.

Formula 1

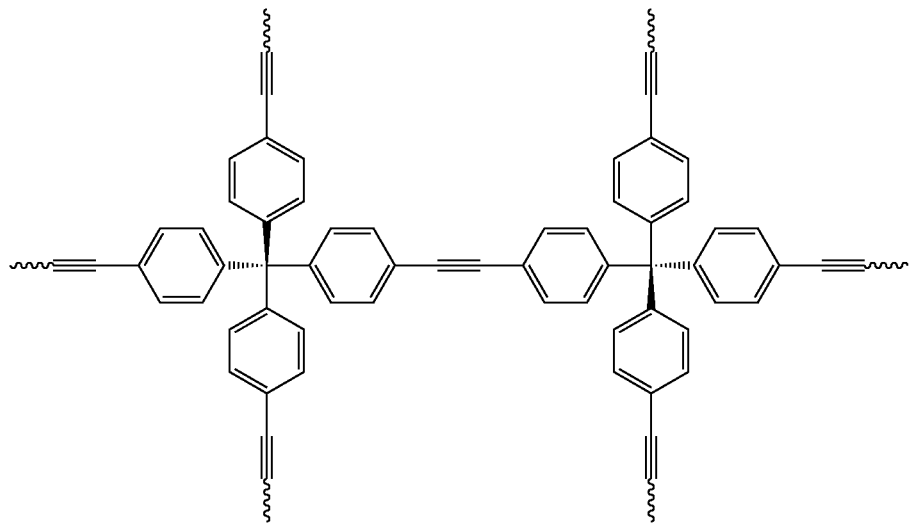

EXAMPLE 2

Synthesis of TPN-2

TPN-2 (Triple-bond based polymer network-2) represented by Formula 2 was fabricated by coupling reaction of 1,3,5-tris(4-iodophenyl)benzene building unit and an acetylene gas building unit. All reactions were performed under Ar atmosphere.

1 mmol of 1,3,5-tris(4-iodophenyl)benzene, 38 mg of CuI and 70 mg of dichlorobis(triphenylphosphine)palladium(II) were placed in a round bottom flask, followed by adding 80 mL of piperidine as a solvent. Then, the mixture was stirred at 60° C. for 12 hours while bubbling acetylene gas. Coupling reaction started with a flow rate of about 10 cc/mL, within 5 minutes after bubbling of acetylene gas. Afterward, the treated mixture was subjected to heat treatment at 60° C. for 12 hours under stirring without acetylene gas bubbling. Following this, the treated material was cooled down to room temperature, filtered and washed using dichloromethane for 3 to 4 days, using water and acetone for 6 hours, and then, using dichloromethane for several hours in sequential order, so as to remove impurities contained in pores. After drying the obtained product at 60° C. under vacuum for 1 day, the dried product was heated at 150° C. for 3 hours.

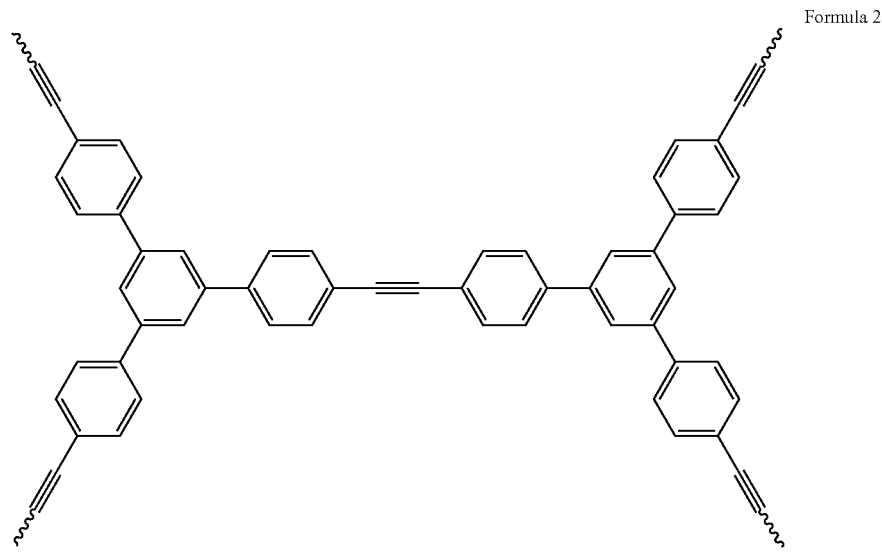

Formula 2

EXAMPLE 3

Synthesis of TPN-3

TPN-3 (Triple-bond based polymer network-3) represented by Formula 3 was fabricated by coupling reaction of tris(4-iodophenyl)amine building unit and an acetylene gas building unit. All reactions were performed under Ar atmosphere.

1 mmol of tris(4-iodophenyl)amine, 38 mg of CuI and 70 mg of dichlorobis(triphenylphosphine)palladium(II) were placed in a round bottom flask, followed by adding 80 mL of piperidine as a solvent. Then, the mixture was stirred at 60° C. for 12 hours while bubbling acetylene gas. Coupling reaction started with a flow rate of about 10 cc/mL, within 5 minutes after bubbling of acetylene gas. Afterward, the treated mixture was subjected to heat treatment at 60° C. for 12 hours under stirring without acetylene gas bubbling. Following this, the treated material was cooled down to room temperature, filtered and washed using dichloromethane for 3 to 4 days, using water and acetone for 6 hours, and then, using dichloromethane for several hours in sequential order, so as to remove impurities contained in pores. After drying the obtained product at 60° C. under vacuum for 1 day, the dried product was heated at 150° C. for 3 hours.

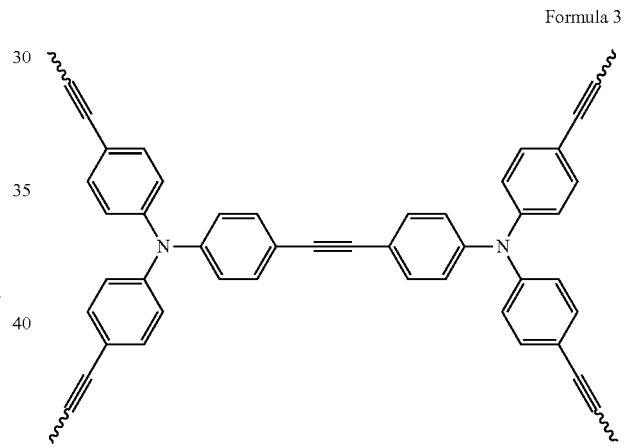

Formula 3

EXAMPLE 4

Synthesis of TPN-1, TPN-2 and TPN-3 Using a Building Unit Having a Bromine Functional Group Instead of a building unit having a iodine functional group, another building unit having a bromine functional group was used to form the same types of TPNs.

For TPN-1 represented by Formula 1, the building unit was tetrakis(4-bromophenyl)methane and the same procedure as described in Example 1 was conducted to produce TPN-1. However, it can be seen that the fabricated TPN-1 generally has a relatively large specific surface area when using a building unit having a iodine functional group rather than a bromine functional group.

For TPN-2 and TPN-3 represented by Formulae 2 and 3, 1,3,5-tris(4-bromophenyl)benzene and tris(4-bromophenyl)amine, respectively, were used to fabricate TPNs according to the same procedures as described in the foregoing examples.

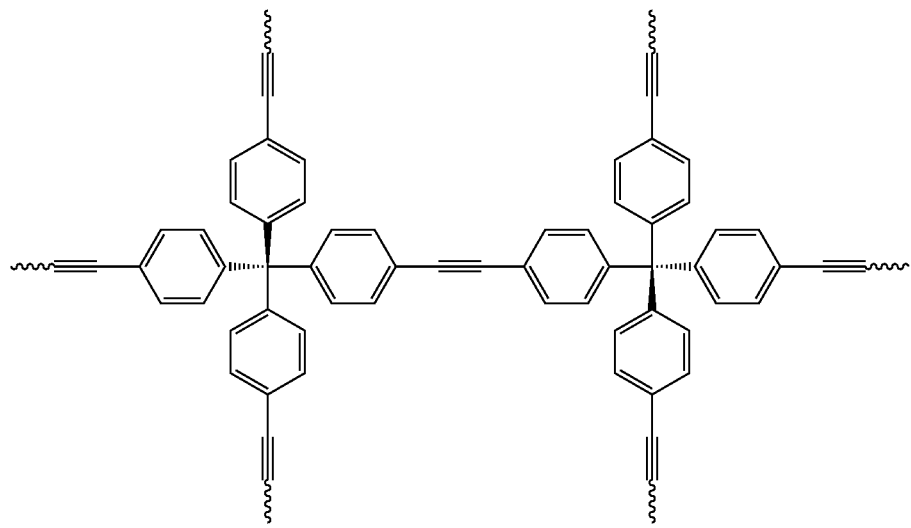

Formula 1

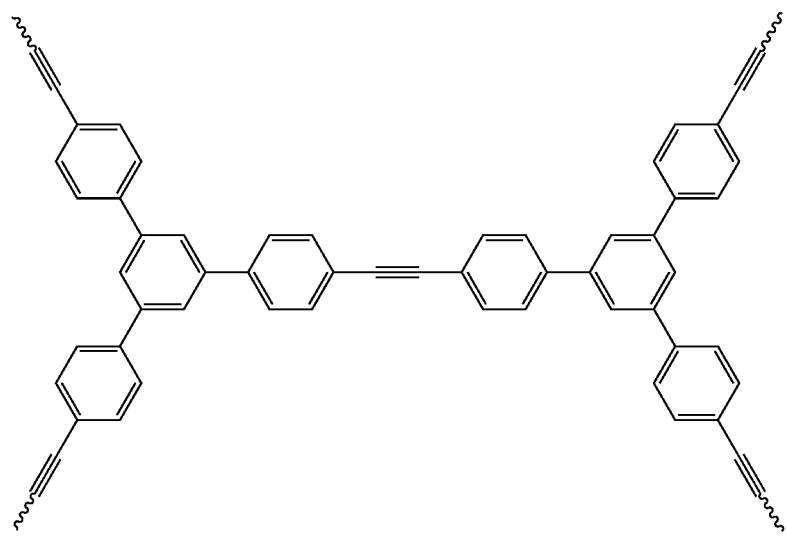

Formula 2

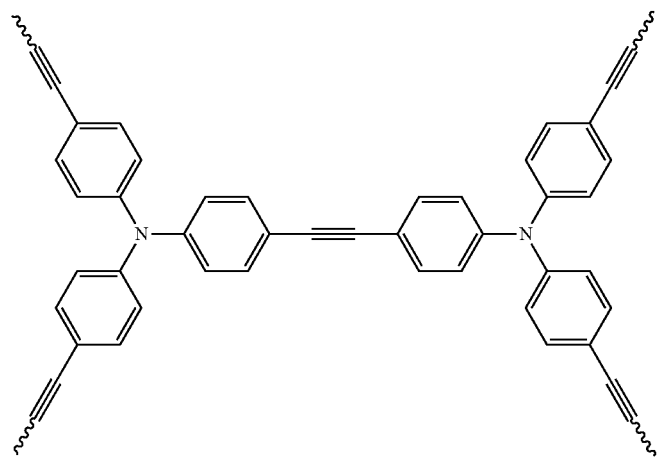

Formula 3

As is apparent from the foregoing description, a method for synthesis of a micro-porous triple-bond based polymer network using acetylene gas according to the present invention is more simple than existing processes for fabrication of polymer networks having triple-bonds, and can enable mass-production of TPNs. The inventive method also has advantages such as increase in specific surface area, improvement of chemical and thermal properties, and so forth. Moreover, the triple-bond contained in the fabricated TPN can be easily functionalized by metal doping and forming an organic metal complex, thereby being utilized in various applications such as hydrogen and carbon dioxide storage materials, heterogeneous catalyst, photo-catalyst, and the like.

CONCLUSION

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method for synthesis of a micro-porous triple-bond based polymer network (TPN) using acetylene gas, comprising conducting a chain coupling reaction of a building unit having an iodine functional group and acetylene gas, wherein the micro-porous TPN comprises a chemical structure selected from the group consisting of: TPN-1 of Formula 1, TPN-2 of Formula 2, and TPN-3 of Formula 3:

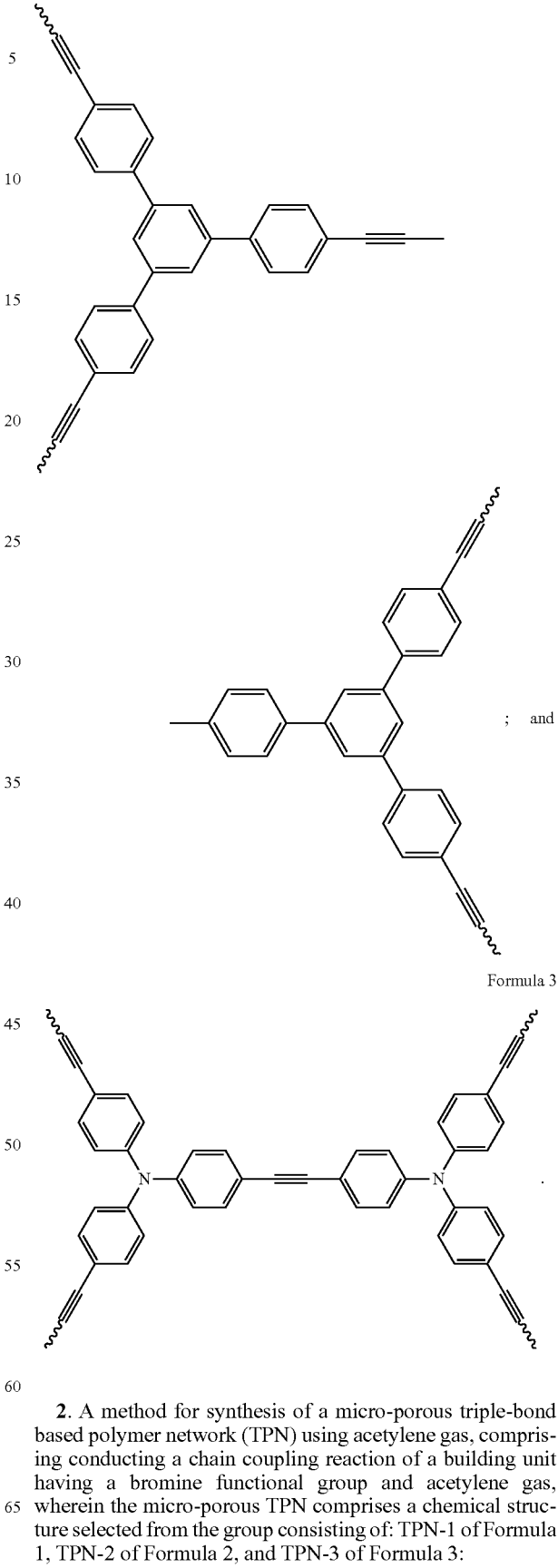

2. A method for synthesis of a micro-porous triple-bond based polymer network (TPN) using acetylene gas, comprising conducting a chain coupling reaction of a building unit having a bromine functional group and acetylene gas, wherein the micro-porous TPN comprises a chemical structure selected from the group consisting of: TPN-1 of Formula 1, TPN-2 of Formula 2, and TPN-3 of Formula 3:

Formula 1
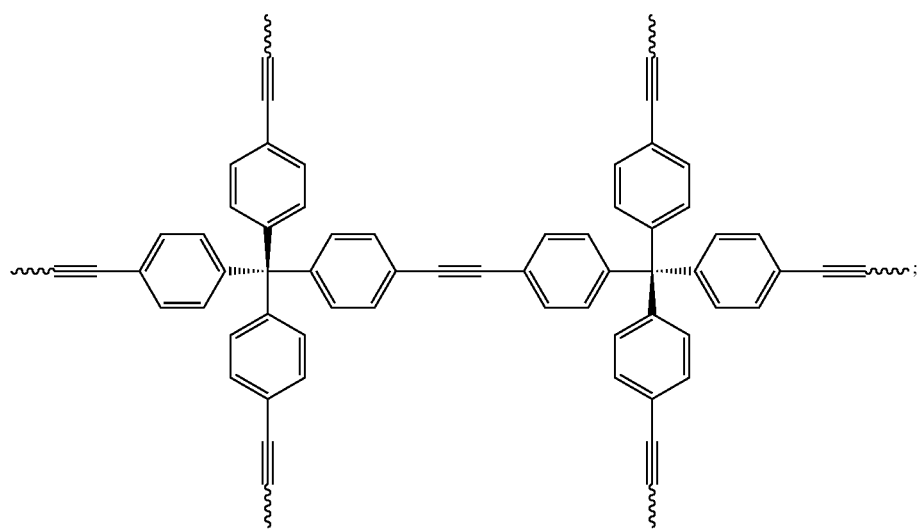
Formula 2
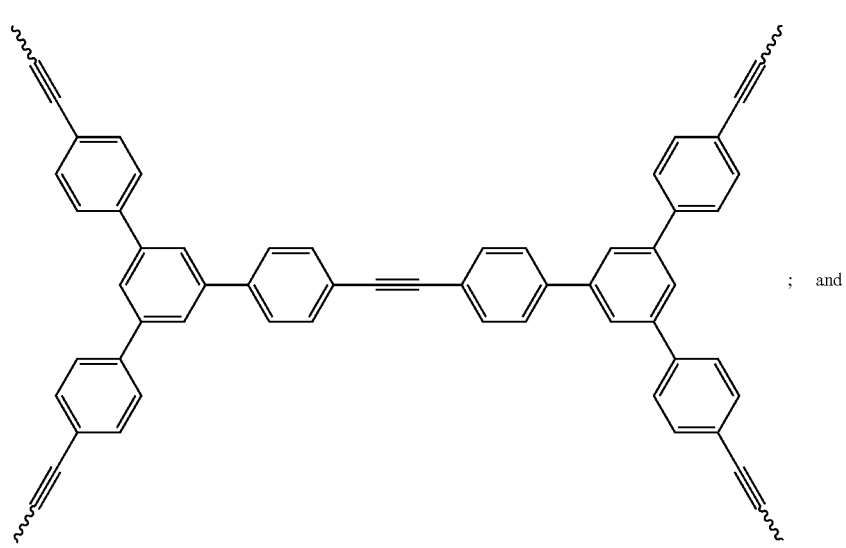
; and
Formula 3
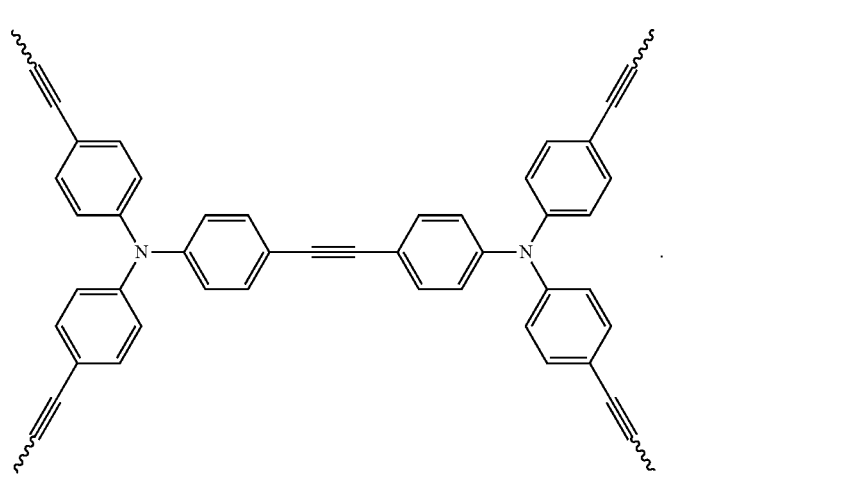
.
* * * * *